US 12,287,951 B2

(12) United States Patent
Fu et al.

(10) Patent No.: US 12,287,951 B2
(45) Date of Patent: *Apr. 29, 2025

(54) AUTOMATIC GENERATION OF STYLIZED ICONS

(71) Applicant: Microsoft Technology Licensing, LLC, Redmond, WA (US)

(72) Inventors: Jianlong Fu, Beijing (CN); Jinpeng Wang, Redmond, WA (US); Chin-Yew Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,368

(22) Filed: Jan. 17, 2024

(65) Prior Publication Data

US 2024/0201824 A1 Jun. 20, 2024

Related U.S. Application Data

(63) Continuation of application No. 17/606,985, filed as application No. PCT/US2020/023461 on Mar. 19, 2020, now Pat. No. 11,914,841.

(30) Foreign Application Priority Data

May 13, 2019 (CN) .......................... 201910395510.6

(51) Int. Cl.
*G06T 11/60* (2006.01)
*G06F 3/048* (2013.01)
(Continued)

(52) U.S. Cl.
CPC ...... *G06F 3/04817* (2013.01); *G06F 3/04845* (2013.01); *G06T 11/001* (2013.01); *G06T 11/60* (2013.01)

(58) Field of Classification Search
CPC ......... G06T 11/001; G06T 11/60; G06T 3/20; G06T 3/40; G06T 3/403–3/408;
(Continued)

(56) References Cited

U.S. PATENT DOCUMENTS

| 2010/0050120 A1* | 2/2010 | Ohazama | G06F 3/0482 715/815 |
| 2010/0179991 A1* | 7/2010 | Lorch | H04L 51/10 715/810 |

(Continued)

FOREIGN PATENT DOCUMENTS

| CA | 2800893 A1 | 12/2011 |
| CN | 105893044 A | 8/2016 |

(Continued)

OTHER PUBLICATIONS

Dhanyaja, et al., "Development of EMR Based HIMS with the Support of Icon Based Text Editor," International Journal of Engineering Research & Technology, vol. 2, Issue No. 9, Sep. 2013, pp. 75-79.

(Continued)

*Primary Examiner* — Wesner Sajous
(74) *Attorney, Agent, or Firm* — Schwegman Lundberg & Woessner, P.A.

(57) ABSTRACT

In embodiments of the present disclosure, there is provided a method for generating a stylized icon automatically. After a query text inputted by a user is obtained, a trained generator is used to generate a structured icon that can characterize a structure of an object, and then the structured icon is stylized, such as performing color padding or adding other styles, so as to generate a high-quality stylized icon for the user. In embodiments of the present disclosure, a structured icon and a stylized icon are generated respectively at two stages, where the structured icon can clearly characterize the structure of the object, while the stylized icon can be (Continued)

richer in color and style. Therefore, the stylized icon generated according to embodiments of the present disclosure has a higher quality and is more realistic, thereby improving the user experience of icon generation.

20 Claims, 8 Drawing Sheets

(51) Int. Cl.
  *G06F 3/04817* (2022.01)
  *G06F 3/04845* (2022.01)
  *G06T 3/40* (2024.01)
  *G06T 11/00* (2006.01)
  *G09G 5/30* (2006.01)
  *H04N 1/60* (2006.01)

(58) Field of Classification Search
  CPC ....... G06T 3/406; G06T 5/001; G06F 3/0482; G06F 3/04817; G06F 3/0485; G06F 3/0481; H04N 1/60; G09G 5/00; G09G 2320/066; G09G 5/026; G09G 5/373; G09G 5/377; G09G 2320/06
  See application file for complete search history.

(56) References Cited

U.S. PATENT DOCUMENTS

| | | | | |
|---|---|---|---|---|
| 2011/0057039 A1* | 3/2011 | Wang | ................ | G06K 7/10722 |
| | | | | 235/472.01 |
| 2014/0136640 A1* | 5/2014 | Shih | ................ | H04L 51/00 |
| | | | | 709/206 |
| 2018/0125716 A1* | 5/2018 | Cho | ................ | G02B 27/0172 |

FOREIGN PATENT DOCUMENTS

| | | |
|---|---|---|
| WO | 2010045735 A1 | 4/2010 |
| WO | 2015065424 A1 | 5/2015 |

OTHER PUBLICATIONS

Office Action Received for Chinese Application No. 201910395510.6, mailed on Mar. 1, 2024, 13 pages (English Translation Provided).

Yuxiao, et al., "Design Semiotics Based Icon Design," Journal of Computer-Aided Design & Computer Graphics, vol. 24, Issue No. 10, Oct. 2012, 11 Pages.

Second Office Action Received for Chinese Application No. 201910395510.6, mailed on Sep. 26, 2024, 8 pages (English Translation Provided).

Notice of Allowance Received for Chinese Application No. 201910395510.6, mailed on Dec. 17, 2024, 04 pages (English Translation Provided).

* cited by examiner

AUTOMATIC GENERATION OF STYLIZED ICONS

PRIORITY

This application a continuation of U.S. patent application Ser. No. 17/606,985, filed Oct. 27, 2021, which is a U.S. National Stage Filing under 35 U.S.C. 371 of International Patent Application Serial No. PCT/US2020/023461, filed Mar. 19, 2020, and published as WO 2020/231513 A1 on Nov. 19, 2020, which claims priority to Chinese Application No. 201910395510.6, filed May 13, 2019, which applications and publication are incorporated herein by reference in their entirety.

BACKGROUND

An icon refers to a graphical symbol which is denotative and highly concentrated and convenient to convey. In the field of computer science, an icon may represent a picture or object. For example, various icons in an operating system can help a user to quickly look for and locate a target program or file. Generally, each of a set of icons may have the same size and attribute format, and may have a relatively small size.

Icons are applied in a wide range of areas. For example, users may need to use visual icons to display and express during document writing, slide preparation and online chatting. Icons are widely used because they are more vivid than texts and are more concise than ordinary images. A number of icons are preset in some common document editing tools, and users may select and insert one or more icons when editing a document. In addition, users may also make their own icons through professional drawing software, or use key words to search for relevant icons on the Internet.

SUMMARY

In embodiments of the present disclosure, there is provided a method for generating a stylized icon automatically. After a query text input by a user is obtained, a trained generator is used to generate a structured icon that can characterize a structure of an object, and then the structured icon is stylized, such as performing color padding or adding other styles, so as to generate a high-quality stylized icon for the user. In embodiments of the present disclosure, a structured icon and a stylized icon are generated respectively at two stages, where the structured icon can clearly characterize the structure of the object, while the stylized icon can be richer in color and style Therefore, the stylized icon generated according to embodiments of the present disclosure has a higher quality and is more realistic, thereby improving the user experience of icon generation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE RENDERINGS

The above and other features, advantages and aspects of embodiments of the present disclosure will be made more apparent by describing the present disclosure in more detail with reference to figures. In the figures, the same or like reference signs represent the same or like elements, wherein.

DETAILED DESCRIPTION

Embodiments of the present disclosure will be described in more detail hereunder with reference to figures. Although figures show some embodiments of the present disclosure, it should be appreciated that the present disclosure may be implemented in many forms and the present disclosure should not be understood as being limited to embodiments illustrated here. On the contrary, these embodiments are provided here to enable more thorough and complete understanding of the present disclosure. It should be appreciated that figures and embodiments of the present disclosure are only used for exemplary purposes and not used to limit the protection scope of the present disclosure.

As used herein, the term "comprise" and its variants are to be read as open terms that mean "comprise, but not limited to." Unless otherwise specified, the term "or" represents "and/or". The term "based on" is to be read as "based at least in part on." The term "an embodiment" is to be read as "at least one embodiment." The term "another embodiment" is to be read as "at least one other embodiment." The definitions of other terms will be provided in the following description.

Traditionally, when a user needs to use an icon, for example, when the user is editing a document or a slide show, he usually searches for related icons on the Internet using keywords, or makes his own icons through professional drawing software. However, the icons found by searching on the network might have less correlation and are of uneven quality. Furthermore, the user needs to have a certain design basis when making an icon by himself, so he will meet a larger difficulty. Hence, it is difficult to obtain the user-desired icons according to traditional methods, and the quality of the obtained icons cannot be ensured. In addition, some of the current icon generation tools or icon making tools can only generate simple icons, or can only generate some stylized words of some texts, resulting in icons having poor quality and lacking reality.

To this end, embodiments of the present disclosure propose an automatic generation technique of stylized icons. Inventors of the present disclosure realize that in order to generate a high-quality stylized icon, it is possible to first determine a structural feature of the icon and then perform a stylization conversion thereof, which can enable the generated icon to be of higher quality and more realistic, and meanwhile reduce the workload of experienced designers. Therefore, in embodiments of the present disclosure, a structured icon and a stylized icon are separately generated at two stages, wherein the structured icon may clearly characterize the structure of the object, while the stylized icon may be richer in color and style. The stylized icons generated according to embodiments of the present disclosure have higher quality and are more realistic, and even an arbitrary icon may be generated, thereby improving the user experience of the icon generation.

Figure 1:
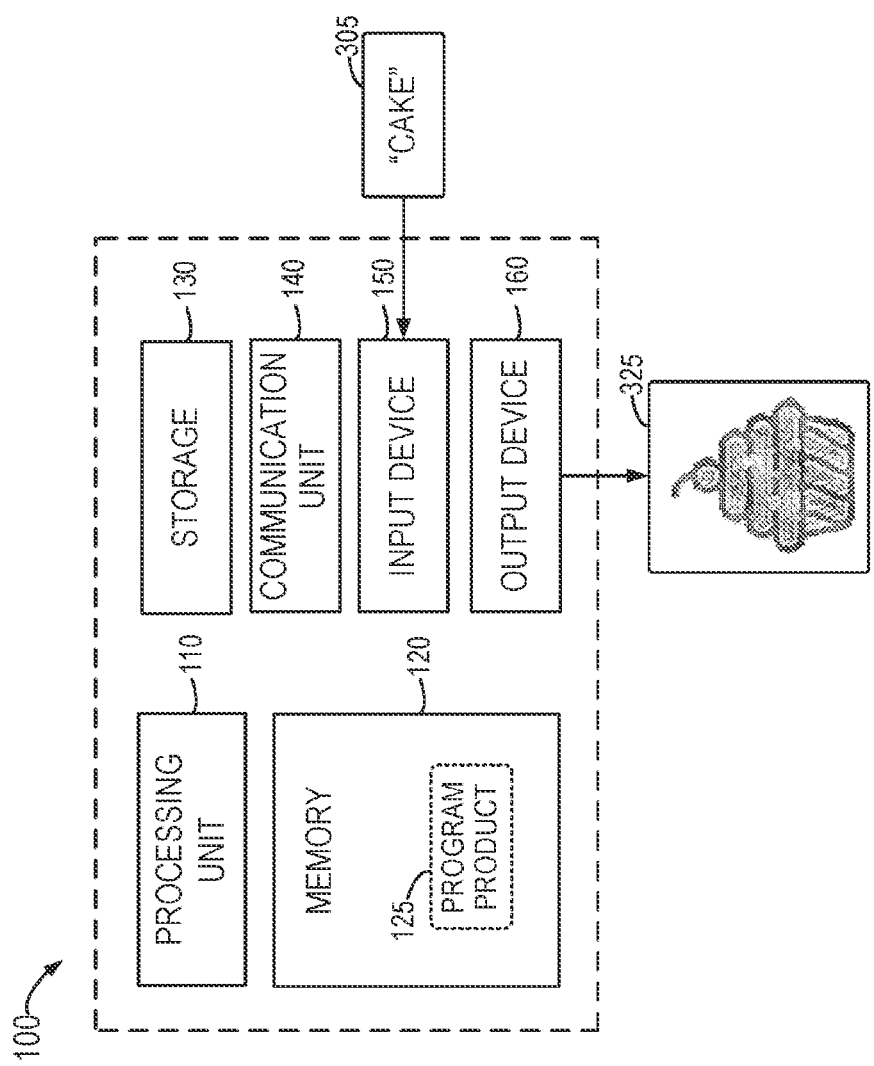
FIG. 1 illustrates a block diagram of a computing device/server in which one or more embodiments of the present disclosure can be implemented.

Reference is made below to FIG. 1 through FIG. 8 to illustrate basic principles and several example embodiments of the present disclosure. FIG. 1 illustrates a block diagram of a computing device/server 100 in which one or more embodiments of the present disclosure can be implemented. It would be appreciated that the computing device/server 100 described in FIG. 1 is merely for illustration and should not limit the function and scope of embodiments of the present disclosure in any manner.

As shown in FIG. 1, the computing device/server 100 is in the form of a general-purpose computing device. Components of the computing device/server 100 may include, but are not limited to, one or more processor(s) or processing unit(s) 110, a memory 120, a storage device 130, one or more communication unit(s) 140, one or more input device (s) 150, and one or more output device(s) 160. The processing unit 110 may be a physical or virtual processor and perform various processes based on programs stored in the memory 120. In a multiprocessor system, a plurality of processing units may execute computer executable instructions in parallel to improve parallel processing capability of the computing device/server 100.

The computing device/server 100 typically comprises various computer storage media. The computer storage media can be any media accessible by the computing device/server 100, including but not limited to volatile and non-volatile media, or removable and non-removable media. The memory 120 may be a volatile memory (for example, a register, cache. Random Access Memory (RAM)), non-volatile memory (for example, a Read-Only Memory (ROM), Electrically Erasable Programmable Read-Only Memory (EEPROM), flash memory), or any combination thereof. The storage device 130 may be any removable or non-removable media and may include machine-readable media such as a flash drive, disk, and any other media, which can be used for storing information and/or data (e.g., training data for training purposes) and accessed within the computing device/server 100.

The computing device/server 100 may further include additional removable/non-removable or volatile/non-volatile storage media. Although not shown in FIG. 1, a magnetic disk drive is provided for reading and writing from/to a removable and non-volatile disk (e.g., "a floppy disk") and an optical disk drive is provided for reading or writing from/to a removable non-volatile optical disk. In such cases, each drive is connected to the bus (not shown) via one or more data media interfaces. The memory 120 may include a computer program product 125, which has one or more program module sets. e.g., including an icon generation model according to embodiments of the present disclosure, and these program modules are configured to perform various methods and acts of various embodiments of the present disclosure.

The communication unit 140 communicates with another computing device via communication media. Additionally, functions of components in the computing device/server 100 can be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 may include one or more input devices such as a mouse, keyboard, tracking ball and the like. The output device 160 may include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown).

As shown in FIG. 1, the computing device/server 100 may receive, through the input device 150, a text input 305 (which may be in a natural language form, such as a word, phrase and sentence) from a user, then use the program product 125 to process the text input 305, and output a stylized icon 325 through the output device 160. For example, after the user enters a query for "cake", the stylized icon of the cake is output. In some embodiments, the user may also select one from a plurality of generated cake icons, and the user may select a desired cake style.

Those skilled in the art should appreciate that although FIG. 1 shows that the text input is received through the input unit 150 and the stylized icon is output through the output unit 160, the input may also be received directly through the communication unit 140 and the output may be transmitted through the communication unit 140. Reference is made below to FIGS. 2-8 to describe in detail example embodiments of how the program product 125 generates the stylized icon based on the user's text input.

Figure 2:
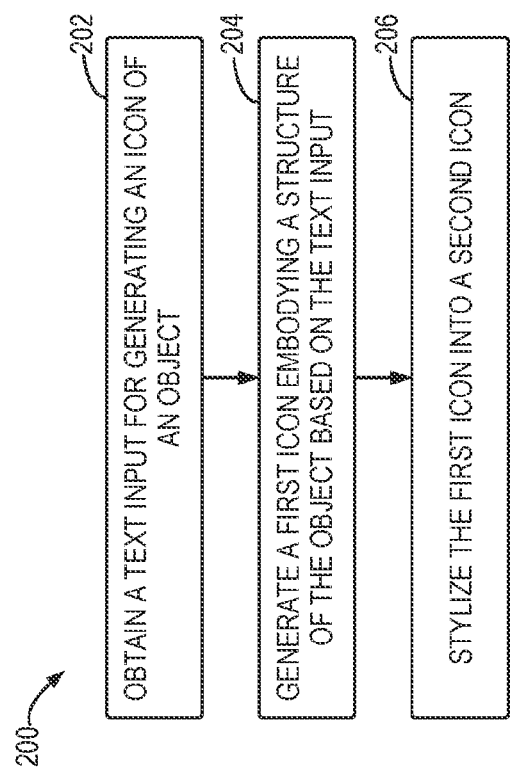
FIG. 2 illustrates a flow chart of a method for automatically generating a stylized icon according to embodiments of the present disclosure.
Figure 3:
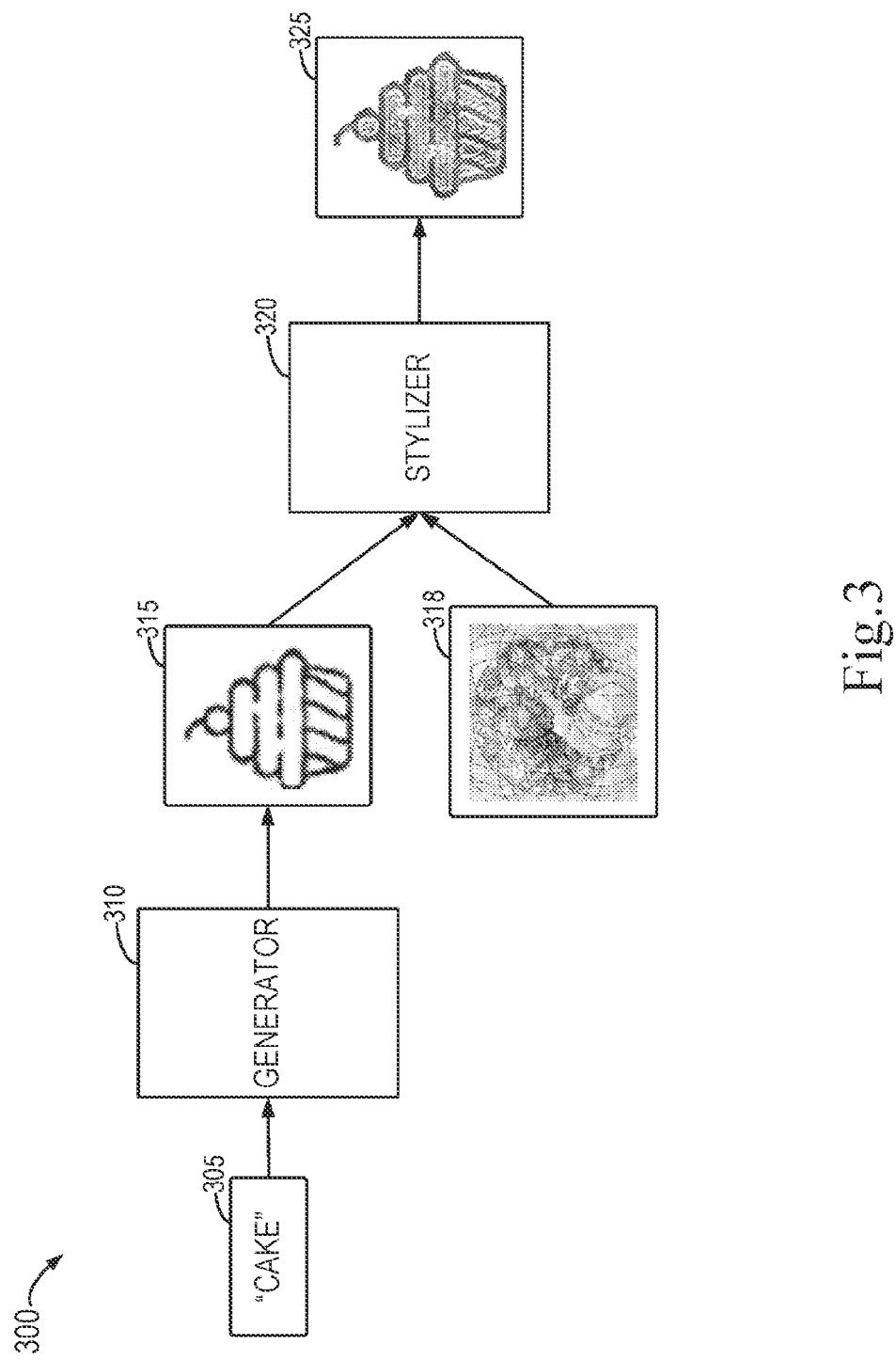
FIG. 3 illustrates a schematic diagram of a process for automatically generating a stylized icon according to embodiments of the present disclosure.

FIG. 2 illustrates a flow chart of a method for generating a stylized icon automatically according to embodiments of the present disclosure. It should be understood that the method 200 may be performed by the computing device/server 100 described with reference to FIG. 1. To better illustrate method 200 of FIG. 2, the method 200 is described with reference to a process 300 for generating a stylized icon automatically as shown in FIG. 3.

At 202, a text input for generating an icon for an object is obtained. For example, referring to FIG. 3, a generator 310 obtains a text input 305 from a user, such as "cake", which indicates that the user wants to generate an icon for the object "cake". Unlike traditional search for icons from a network or local resource repository, embodiments of the present disclosure use an icon generation model to generate icons, and the generated icons might not exist before.

At 204, a first icon embodying a structure of the object is generated based on the text input, and the structure of the object is characterized by one or more lines. For example, the generator 310 in FIG. 3 (which has been trained, and an example embodiment of training the generator 310 is described below with reference to FIGS. 7-8) generates a simple cake structured icon 315 according to the text input 305 (e.g., "cake"). In the structured icon 315, the structural features of the object "cake" can be clearly embodied, and the structure of the cake is characterized by a collection of lines, such as lines and/or curves. In some embodiments of the present disclosure, the structured icon may be a simple black and white icon.

At 206, the first icon is stylized into a second icon. In some embodiments, the first icon may be stylized into the second icon according to a reference image such that the stylized icon has a style similar to the reference image. For example, a stylizer 320 in FIG. 3 converts a simple structured icon 315 into a stylized icon 325 having a mosaic style according to the style (e.g., mosaic style) of the reference image 318. Thus, in method 200 of the present disclosure, the structured icon 315 and the stylized icon 325 are respectively generated at two stages, wherein the structured icon 315 can clearly characterize the structure of the object, while the stylized icon 325 is richer in color and style.

In some embodiments, the first icon may also be stylized into a second icon based on a reference color or hue. For example, if the reference color is blue, the first icon may be stylized into a blue hue icon. Alternatively, the first icon may also be stylized into a second icon according to some parameters in a machine learning model. In embodiments of the present disclosure, the stylizing process may include, but is not limited to, color padding, effect padding, style rendering and other pixel conversions for icons. Therefore, the stylized icons generated according to embodiments of the present disclosure are of higher quality and more realistic, and can improve the user experience of the icon generation.

In some embodiments, after the structured icon 315 is generated, the structured icon 315 may be edited according to the user's intent, for example, the user may adjust shape(s) and attribute(s) of the line(s) in the structured icon. For example, the user may adjust the lines in the structured icon 315 to be thicker, or may adjust candle lines in the structured icon 315 to be larger. In this way, it is possible to provide the user with an option of further adjusting the generated icon, so that the generated icon better satisfies the user's intent, and further improves the user experience. After the user adjusts the object structure in the structured icon 315, the stylizer 320 performs style conversion for the adjusted structured icon 315.

In some embodiments, the stylizer 320 may further consider semantic information of the object when adding style to the structured icon 315. For example, assume that the generated structured icon is a leaf icon, and the leaf's usual colors are green, red, or yellow according to semantics and meaning of the leaf, the stylizer 320 performs coloring for the black and white structured icon 315 based on the semantics of the leaf. For example, the stylizer 320 may add green, red, yellow without adding colors that do not match the semantics of the leaf such as white and black.

Figure 4:
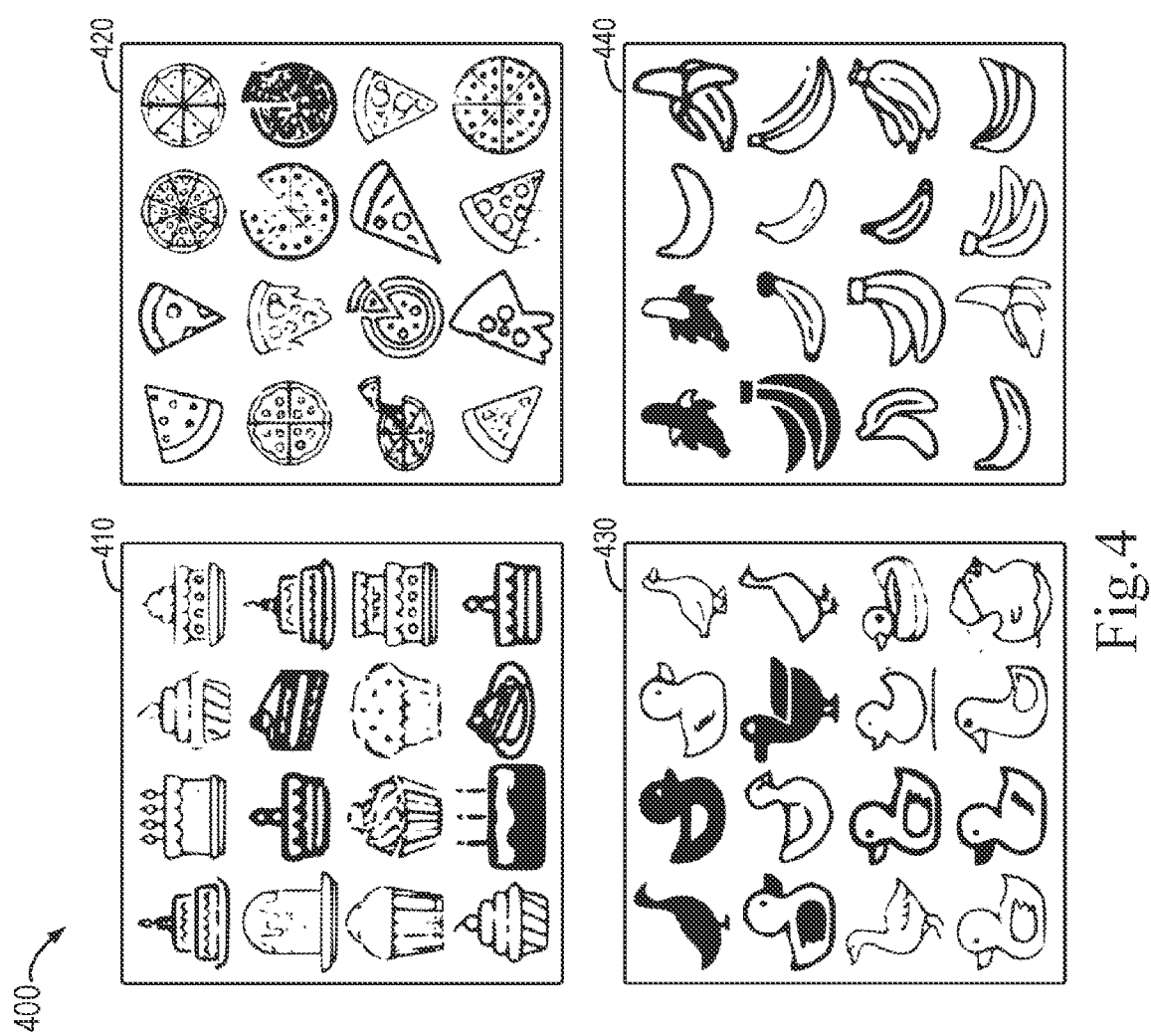
FIG. 4 illustrates a schematic diagram of an example set of structured icons according to embodiments of the present disclosure.

Referring to FIG. 4, a schematic diagram is shown of an example set 400 of structured icons according to an embodiment of the present disclosure. As shown in FIG. 4, the example set 400 comprises a structured icon set 410 of cakes, a structured icon set 420 of pizzas, a structured icon set 430 of ducks, and a structured icon set 440 of bananas. These icons may be simple black and white, and their respective structural features may be characterized through the lines. These icon sets may, for example, be structured icon sets generated by the generator 310 of the present disclosure based on corresponding user queries. For example, when the user enters "cake", the structured icon set 410 of cakes may be generated for selection by the user. When the user enters "pizza", the structured icon set 420 of pizzas may be generated for selection by the user. When the user enters "duck", the structured icon set 430 of ducks may be generated for selection by the user. When the user enters "banana", the structured icon set 440 of bananas may be generated for selection by the user.

In some embodiments, the generator 310 may generate a plurality of structured icons according to the user-entered query, and as shown in FIG. 4, the user may then select one icon he desires the most for subsequent stylization. Alternatively, the generator 310 may also generate only one structured icon (e.g., structured icon 315 shown in FIG. 3) according to the user-entered query, and then the stylizer 320 will stylize this structured icon directly, without requiring the user to make the selection.

Figure 5:
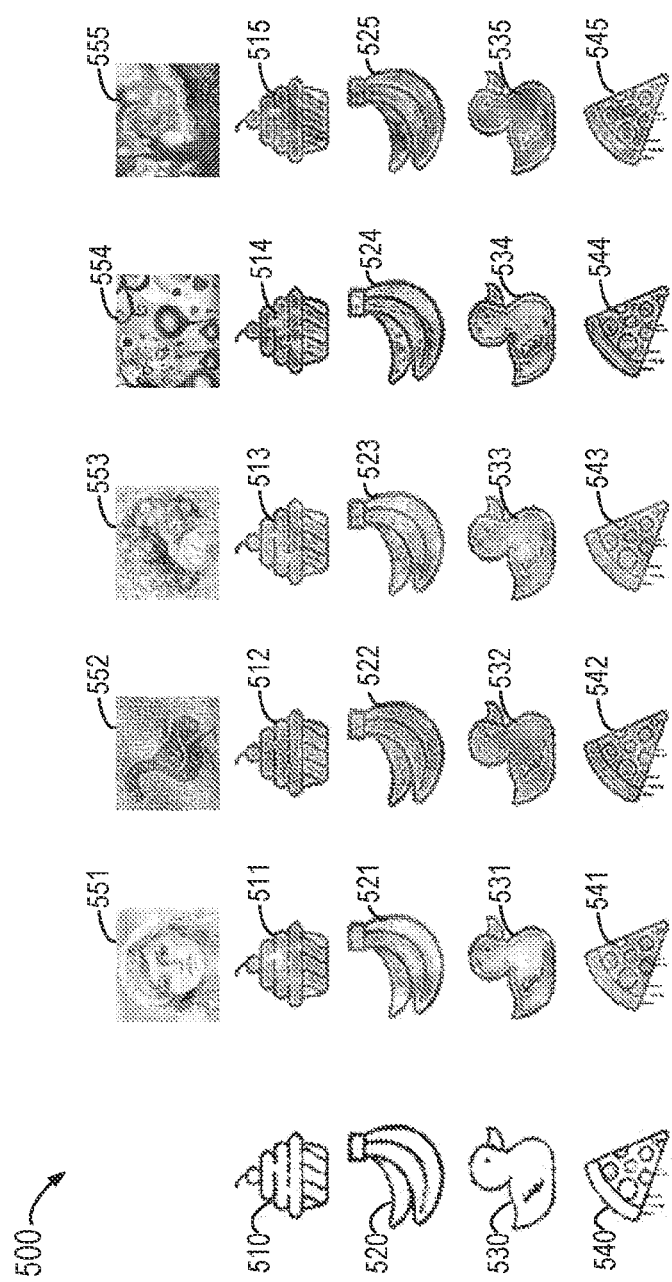
FIG. 5 illustrates a schematic diagram of an example set of stylized icons according to embodiments of the present disclosure.

FIG. 5 illustrates a schematic diagram of an example set 500 of stylized icons according to an embodiment of the present disclosure. As shown in FIG. 5, structured icons 510, 520, 530 and 540 may be simple structured icons generated by the generator 310 based on different user queries respectively. Next, the stylizer 320 may style these structured icons 510, 520, 530 and 540 into icons of different styles. For example, for the structured icon 510: if the reference image is a pencil style image 551, a pencil style cake icon 511 is generated; if the reference image is a stone style image 552, a stone style cake icon 512 is generated; if the reference image is a mosaic style image 553, a mosaic style cake icon 513 is generated; if the reference image is a candy style image 554, a candy style cake icon 514 is generated: if the reference image is a starry sky style image 555, a starry style cake icon 515 is generated. In some embodiments, the reference image may be selected by the user. Alternatively, a default reference image may also be set for the user without the user's selection. If the user is not satisfied with the generated stylized icon, the reference image may be changed and styling may be performed again.

Similarly, the stylizer 320 may also generate various styles of banana icons 521-525, generate various styles of duck icons 531-535, and generate various styles of pizza icons 541-545. Accordingly, according to embodiments of the present disclosure, it is possible to generate various styles of high-quality icons according to the user's intent, thereby improving the user experience. In addition, the solution according to embodiments of the present disclosure may be embedded in some office software as a function module, so as to provide users with high-quality stylized icons, thereby improving office efficiency of the users.

In some embodiments, if multiple semantical meanings of multiple objects (such as "meadow" and "horse") may also be obtained from the user's query (e.g., a sentence "a horse on the meadow"), then a meadow icon and a horse icon are generated respectively. Next, the meadow icon and the horse icon may be combined to generate a combination icon of "a horse on the meadow". In this way, more complex icon generation demands from the users can be satisfied, and the user experience can be further improved.

In some embodiments, icons in the form of animation may also be created according to the user's query. For example, a series of multiple icons may be generated. These icons may be in a timing sequential relationship there between. An icon animation other than a static form may be created by combining this series of icons. It is possible, in this way, to provide the user more forms of icon resources and further improve the user experience.

Figure 6:
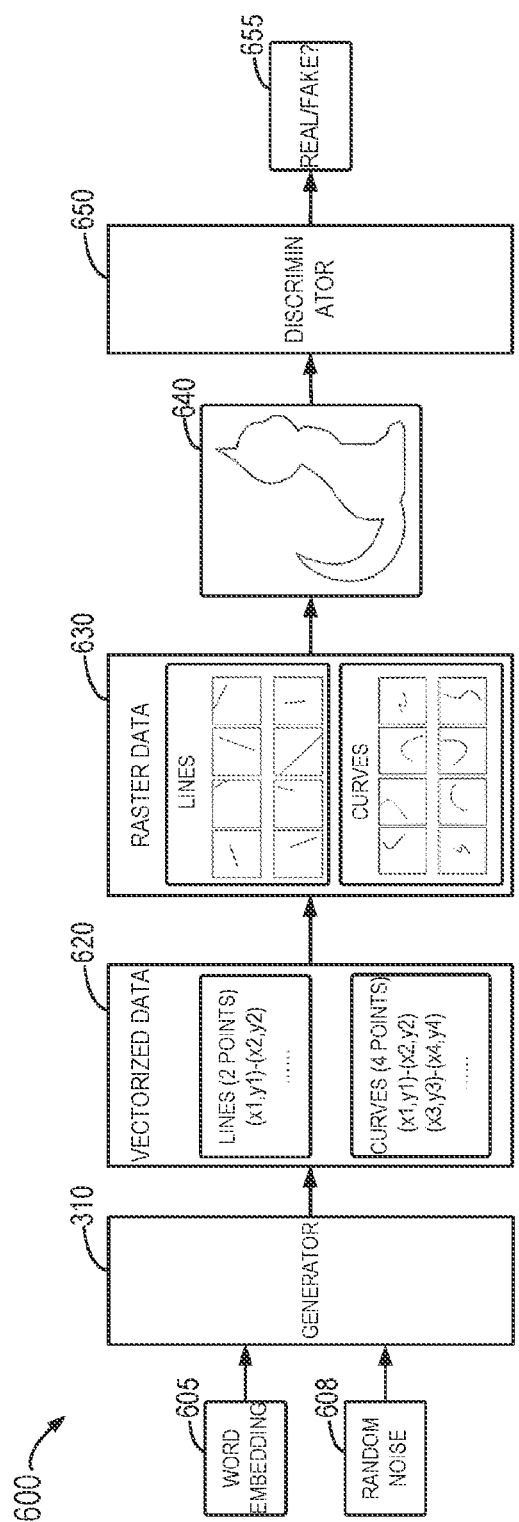
FIG. 6 illustrates a schematic diagram of a process for generating a structured icon according to embodiments of the present disclosure.

FIG. 6 illustrates a schematic diagram of a process 600 for generating a structured icon according to embodiments of the present disclosure. As shown in FIG. 6, the generator 310 first obtains a word embedding 605 and random noise 608 for the user query, wherein the user query may include at least one of a category, a keyword, a text description and an attribute associated with the object, while the random noise 608 is usually generated based on a random value between 0-1, and it may be a random variable that is subject to a Gaussian distribution. In addition, it is further possible to specify the resolution of the structured icon to be generated, for example 64×64.

The generator 310 first generates vectorized structure data 620 based on the word embedding 605 and the random noise 608, and the vectorized structure data 620 may include line and curve parameters, such as coordinate data of lines and curves. As shown in FIG. 6, a line may usually be represented with coordinates of two points, whereas a curve may usually be represented with coordinates of 4 points. In some embodiments, the vectorized structure data 620 may be stored in a format of a Scalable Vector Graphics (SVG) file. Compared to ordinary images, lines of a vector diagram have clearer lines and smoother edges. Accordingly, some embodiments of the present disclosure can make the generated icons higher quality by use of vectorization. In some embodiments of the present disclosure, the generator 310 may be implemented by a fully-connected layer.

Further referring to FIG. 6, a rendering model then converts the vectorized structure data 620 into raster data 630 of the icon, and the raster data 630 may include a set of lines and a set of curves, as shown in FIG. 6. Next, the rendering model renders the structured icon 640 by maximum pooling based on the set of lines and the set of curves in the raster data 630, and the structured icon 640 has a higher line quality. It should be appreciated that although the rendering model performing a rendering act is provided separately from the generator 310 in FIG. 6, the rendering model may also be included in the generator 310. In some embodiments, the rendering model may be implemented by a two-dimensional deconvolution of several layers (e.g., 5 layers, 6 layers, etc.).

In some embodiments, some icon rules may also be set to adjust the generated structured icon. For example, after the generator 310 generates the structured icon, vertices that are close in distance in the structured icon are connected to optimize the structured icon. In addition, it is further possible to set some other icon rules for optimization, for example, make irregular lines smoother, remove irrelevant lines, adjust the size and direction of the object structure, and so on.

Figure 7:
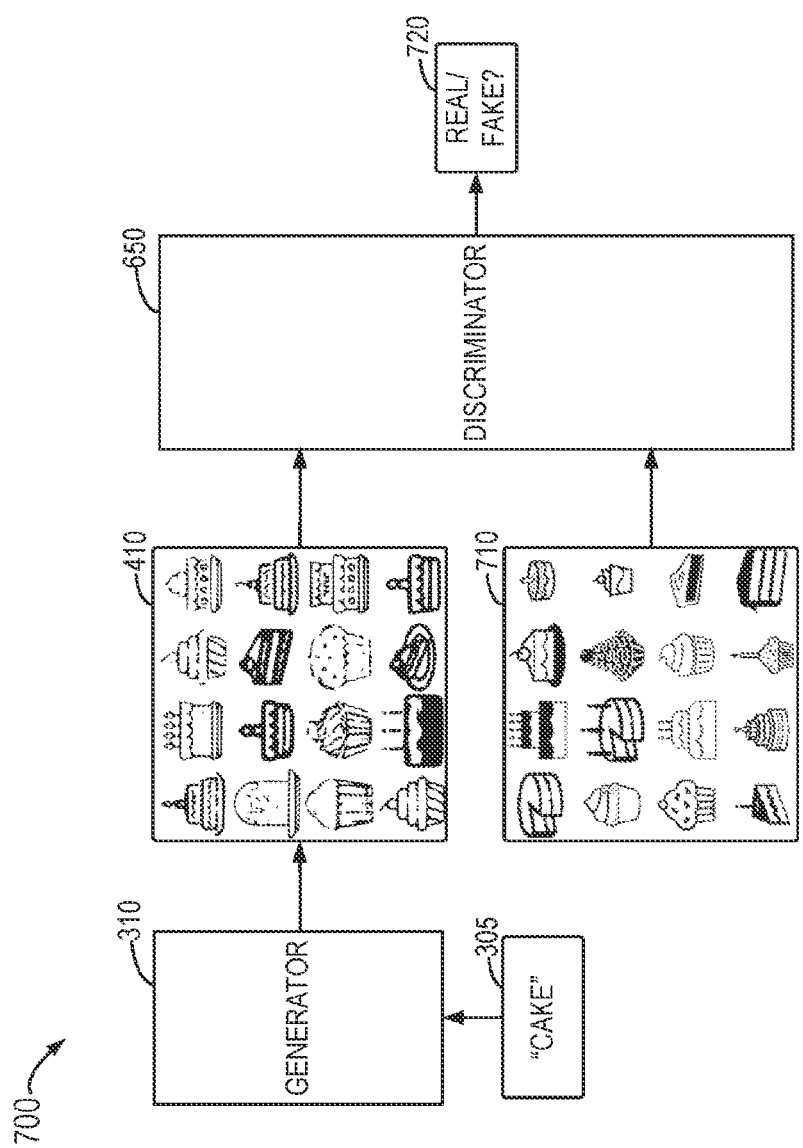
FIG. 7 illustrates a schematic diagram of an architecture for using a Generative Adversarial Network (GAN) to train an icon generating model according to embodiments of the present disclosure.
Figure 8:
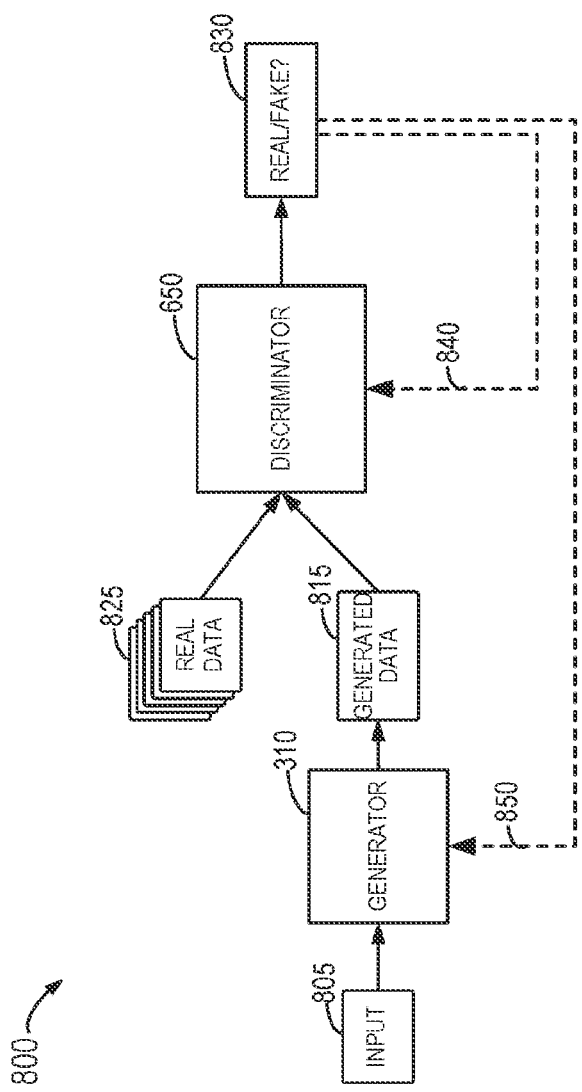
FIG. 8 shows a schematic diagram of a process for using GAN to train the icon generating model according to embodiments of the present disclosure.

Further referring to FIG. 6, a discriminator 650 may determine whether the generated structured icon 640 is real or fake, as indicated at 655, thereby helping to train the generator 310 to generate a more realistic structured icon. In embodiments of the present disclosure, the generator 310 and the discriminator 650 may form an icon generating model, and the trained icon generating model can generate a high-quality stylized icon for the user query. FIG. 7 and FIG. 8 illustrate example embodiments for training an icon generating model including the generator 310 and discriminator 650.

FIG. 7 illustrates a schematic diagram of an architecture 700 for using a GAN to train the icon generating model according to an embodiment of the present disclosure. As shown in FIG. 7, the architecture 700 mainly comprises the generator 310 and the discriminator 650. During training, the generator 310 generates structured icons 410 based on text input 305, and then transmits the generated structured icons 410 together with real structured icons 710 to the discriminator 650, and the discriminator 650 trains the discriminator 650 and the generator 310 based on judgment 720 of reality of the inputted icons. Compared to training with ordinary images, since embodiments of the present disclosure perform the training using simple structured icons, the icon generating model can be trained more easily and quickly.

FIG. 7 shows an example of training using real icons of cake for the object "cake". Similarly, other categories of real icons may also be used for training, including but not limited to animals, people, food, sports and the like. In some embodiments, a Wasserstein GAN (WGAN) algorithm may be employed to train the icon generating model of the present disclosure. As compared with the ordinary GAN, WGAN is easier to train and its convergence rate is faster.

FIG. 8 shows a schematic diagram of a process 800 for using a GAN to train an icon generating model according to embodiments of the present disclosure. As shown in FIG. 8, the generator 310 generates corresponding generated data 815 based on an input 805, and then transmits the generated data 815 together with the real data 825 to the discriminator 650, and the discriminator 650 judges whether each input data is real or fake.

In the training process, the discriminator 650 and the generator 310 are iteratively trained. In this process, the discriminator 650 and the generator 310 constantly optimize their respective networks to form a competitive confrontation until both parties reach a dynamic balance (namely, Nash Equilibrium). After the training is completed, the generator 310 can simulate the distribution of the real data 825 (the generated data 815 is the same as the real data 825), and the discriminator 650 cannot determine the reality of the generated data at this time, and the accuracy rate of the determination is 50%.

In a specific iterative training process, the generator 310 is first fixed, and the discriminator 650 is trained, as indicated by arrow 840. The discriminator 650 may mark the output after the real data 825 is processed as 1, and mark the output after the generated data 815 is processed as 0. In this way, it is possible to first train the discriminator 650. Then, the discriminator 650 is fixed and the generator 310 is trained, as shown by arrow 850. The generator 310 optimizes its own generation network such that the outputted generated data 815 is consistent with the real data 825 and the generated data can fake out the discriminator 650's judgement. The discriminator 650 and the generator 310 can be iteratively trained multiple times until the icon generating model becomes converged.

The method and functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing devices, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, device, or device. The machine-readable medium may be a machine-readable signal medium or a machine-readable storage medium. A machine-readable medium may include but not limited to an electronic, magnetic, optical, electromagnetic, infrared, or semiconductor system, device, or device, or any suitable combination of the foregoing. More specific examples of the machine-readable storage medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while the operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Some example embodiments of the present disclosure are listed below.

In one aspect, there is provided a computer-implemented method. The method comprises: obtaining a text input for generating an icon of an object: generating a first icon embodying a structure of the object based on the text input, wherein the structure of the object is characterized by one or more lines; and stylizing the first icon into a second icon.

In some embodiments, wherein obtaining a text input for generating an icon of an object comprises: obtaining the text input and a random input, wherein the text input comprises at least one of a category, a keyword, a text description and an attribute associated with the object, and the random input is a random variable subject to a Gaussian distribution.

In some embodiments, wherein generating a first icon embodying a structure of the object comprises: generating vectorized structural data based on the text input and the random input, wherein the vectorized structural data comprises coordinate data of lines and the curves; obtaining raster data of the first icon based on the vectorized structural data, wherein the raster data comprises a set of lines and a set of curves; and rendering the first icon based on the set of lines and the set of curves in the raster data.

In some embodiments, wherein rendering the first icon comprises: rendering a candidate icon based on the set of lines and the set of curves in the raster data; and optimizing the candidate icon as the first icon by connecting vertices in the candidate icon that are close in distance.

In some embodiments, wherein stylizing the first icon into the second icon comprises: receiving a user input for the first icon, wherein the user input indicates to adjust at least one of a shape and an attribute of a line in the first icon, and adjusting the structure of the object in the first icon based on the received user input.

In some embodiments, wherein the stylizing the first icon into the second icon further comprises: determining semantic information of the object based on the text input, and performing color padding for the first icon based on the structure and the semantic information of the object.

In some embodiments, wherein the generating of the first icon is performed by a generator, the method further comprises iteratively training a discriminator and the generator using a Generative Adversarial Network (GAN), wherein the discriminator is used to determine whether an icon is real or fake.

In some embodiments, the method further comprises: generating at least two icons based on at least two semantical meanings obtained from the text input; and combining the at least two icons into a single new icon.

In some embodiments, the method further comprises: obtaining a series of icons based on the text input; and creating an icon animation based on the series of icons.

In another aspect, an electronic device is provided. The electronic device comprises a processing unit and a memory coupled to the processing unit and storing instructions. The instructions, when executed by the processing unit, perform acts comprising: obtaining a text input for generating an icon of an object; generating a first icon embodying a structure of the object based on the text input, wherein the structure of the object is characterized by one or more lines; and stylizing the first icon into a second icon.

In some embodiments, wherein obtaining a text input for generating an icon of an object comprises: obtaining the text input and a random input, wherein the text input comprises at least one of a category, a keyword, a text description and an attribute associated with the object, and the random input is a random variable subject to a Gaussian distribution.

In some embodiments, wherein generating a first icon embodying a structure of the object comprises: generating vectorized structural data based on the text input and the random input, wherein the vectorized structural data comprises coordinate data of lines and the curves; obtaining raster data of the first icon based on the vectorized structural data, wherein the raster data comprises a set of lines and a set of curves; and rendering the first icon based on the set of lines and the set of curves in the raster data.

In some embodiments, wherein rendering the first icon comprises: rendering a candidate icon based on the set of lines and the set of curves in the raster data; and optimizing the candidate icon as the first icon by connecting vertices in the candidate icon that are close in distance.

In some embodiments, wherein stylizing the first icon into the second icon comprises: receiving a user input for the first icon, wherein the user input indicates to adjust at least one of a shape and an attribute of lines in the first icon; and adjusting the structure of the object in the first icon based on the received user input.

In some embodiments, wherein stylizing the first icon into the second icon further comprises: determining semantic information of the object based on the text input; and performing color padding for the first icon based on the structure and the semantic information of the object.

In some embodiments, wherein the generating of the first icon is performed by a generator, and the acts further comprise iteratively training a discriminator and the generator using a Generative Adversarial Network (GAN), wherein the discriminator is used to determine whether an icon is real or fake.

In some embodiments, the acts further comprise: generating at least two icons based on at least two semantical meanings obtained from the text input; and combining the at least two icons into a single new icon.

In some embodiments, the acts further comprise: obtaining a series of icons based on the text input; and creating an icon animation based on the series of icons.

In a further aspect, a computer program product is provided. The computer program product is stored in a computer storage medium and comprises machine-executable instructions. The instructions, when executed in a device, cause the device to: obtain a text input for generating an icon of an object; generate a first icon embodying a structure of the object based on the text input, wherein the structure of the object is characterized by one or more lines; and stylize the first icon into a second icon.

In some embodiments, wherein obtaining a text input for generating an icon of an object comprises: obtaining the text input and a random input, wherein the text input comprises at least one of a category, a keyword, a text description and an attribute associated with the object, and the random input is a random variable subject to a Gaussian distribution.

In some embodiments, wherein generating a first icon embodying a structure of the object comprises: generating vectorized structural data based on the text input and the random input, wherein the vectorized structural data comprises coordinate data of lines and the curves; obtaining raster data of the first icon based on the vectorized structural data, wherein the raster data comprises a set of lines and a set of curves; and rendering the first icon based on the set of lines and the set of curves in the raster data.

In some embodiments, wherein rendering the first icon comprises: rendering a candidate icon based on the set of lines and the set of curves in the raster data; and optimizing the candidate icon as the first icon by connecting vertices in the candidate icon that are close in distance.

In some embodiments, wherein stylizing the first icon into the second icon comprises: receiving a user input for the first icon, wherein the user input indicates to adjust at least one of a shape and an attribute of lines in the first icon; and adjusting the structure of the object in the first icon based on the received user input.

In some embodiments, wherein stylizing the first icon into the second icon further comprises: determining semantic information of the object based on the text input; and performing color padding for the first icon based on the structure and the semantic information of the object.

In some embodiments, wherein the generating of the first icon is performed by a generator, and the machine-executable instructions, when executed in the device, cause the device to iteratively train a discriminator and the generator using a Generative Adversarial Network (GAN), wherein the discriminator is used to determine whether an icon is real or fake.

In some embodiments, the machine-executable instructions, when executed in the device, cause the device to: generate at least two icons based on at least two semantical meanings obtained from the text input; and combine the at least two icons into a single new icon.

In some embodiments, the machine-executable instructions, when executed in the device, cause the device to: obtain a series of icons based on the text input; and create an icon animation based on the series of icons.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   obtaining a text input for generating an icon of an object;
   generating a random value for a noise input;
   generating a first icon embodying a structure of the object based on the text input and the noise input, the structure of the object being characterized by one or more lines;
   identifying a reference image having a corresponding style; and
   stylizing the first icon into a second icon according to the style of the reference image.

2. The method according to claim 1, wherein the text input comprises at least one of a category, a keyword, a text description, or an attribute associated with the object.

3. The method according to claim 1, wherein generating the first icon embodying the structure of the object comprises:
   generating vectorized structural data based on the text input and the noise input, the vectorized structural data comprising coordinate data of lines and curves;
   obtaining raster data of the first icon based on the vectorized structural data, the raster data comprising a set of lines and a set of curves; and
   rendering the first icon based on the set of lines and the set of curves in the raster data.

4. The method according to claim 3, wherein rendering the first icon comprises:
   rendering a candidate icon based on the set of lines and the set of curves in the raster data; and
   optimizing the candidate icon as the first icon by connecting vertices in the candidate icon that are close in distance.

5. The method according to claim 1, wherein stylizing the first icon into the second icon comprises:
   receiving a user input for the first icon, the user input indicating to adjust at least one of a shape and an attribute of a line in the first icon; and
   adjusting the structure of the object in the first icon based on the received user input.

6. The method according to claim 5, wherein stylizing the first icon into the second icon further comprises:
   determining semantic information of the object based on the text input; and
   performing color padding for the first icon based on the structure and the semantic information of the object.

7. The method according to claim 1, wherein the generating of the first icon is performed by a generator, the method further comprising:
   iteratively training a discriminator and the generator using a Generative Adversarial Network (GAN), the discriminator being used to determine whether an icon is real or fake.

8. The method according to claim 1, further comprising:
   generating at least two icons based on at least two objects identified in the text input; and
   combining the at least two icons into a single new icon.

9. The method according to claim 1, further comprising:
   obtaining a series of icons based on the text input; and
   creating an icon animation based on the series of icons.

10. The method of claim 1, wherein identifying the reference image comprises:
    receiving a selection of the reference image from a user of a device.

11. The method of claim 1, wherein identifying the reference image comprises:

identifying a default reference image set for a user of a device without receiving a user's selection of the reference image.

12. The method of claim 11, further comprising:

causing a display of the second icon at the device; and receiving a selection of another reference image from the user of the device in response to causing the display.

13. The method of claim 1, wherein the second icon has a style similar to the reference image.

14. The method of claim 1, wherein stylizing the first icon into the second icon is based on at least one of a reference color, a color padding, an effect padding, or a style rendering of the reference image.

15. An electronic device, comprising:

a processing unit;

a memory coupled to the processing unit and storing instructions that, when executed by the processing unit, perform operations comprising:

obtaining a text input for generating an icon of an object;

generating a random value for a noise input;

generating a first icon embodying a structure of the object based on the text input and the noise input, the structure of the object being characterized by one or more lines;

identifying a reference image having a corresponding style; and stylizing the first icon into a second icon according to the style of the reference image.

16. The device according to claim 15, wherein the text input comprises at least one of a category, a keyword, a text description, or an attribute associated with the object.

17. The device according to claim 15, wherein generating a first icon embodying a structure of the object comprises:

generating vectorized structural data based on the text input and the noise input, the vectorized structural data comprising coordinate data of lines and curves;

obtaining raster data of the first icon based on the vectorized structural data, the raster data comprising a set of lines and a set of curves; and rendering the first icon based on the set of lines and the set of curves in the raster data.

18. The device according to claim 17, wherein rendering the first icon comprises:

rendering a candidate icon based on the set of lines and the set of curves in the raster data; and optimizing the candidate icon as the first icon by connecting vertices in the candidate icon that are close in distance.

19. The device according to claim 15, wherein stylizing the first icon into the second icon comprises:

receiving a user input for the first icon, the user input indicating to adjust at least one of a shape and an attribute of a line in the first icon; and adjusting the structure of the object in the first icon based on the received user input.

20. A computer program product stored in a computer storage medium and comprising machine-executable instructions that, when executed in a device, cause the device to perform operations comprising:

obtaining a text input for generating an icon of an object;

generating a random value for a noise input;

generating a first icon embodying a structure of the object based on the text input and the noise input, the structure of the object being characterized by one or more lines;

identifying a reference image having a corresponding style; and stylizing the first icon into a second icon according to the style of the reference image.

* * * * *